(12) United States Patent
Al-Banna et al.

(10) Patent No.: US 8,300,640 B2
(45) Date of Patent: Oct. 30, 2012

(54) MULTI-SERVICE PHY BOX

(75) Inventors: Ayham Al-Banna, Darien, IL (US); Erich Arnold, Naperville, IL (US); Thomas J. Cloonan, Lisle, IL (US); Jeff Howe, West Chicago, IL (US)

(73) Assignee: ARRIS Group, Inc., Suwanee, GA (US)

( * ) Notice: Subject to any disclaimer, the term of this patent is extended or adjusted under 35 U.S.C. 154(b) by 143 days.

(21) Appl. No.: 12/426,763

(22) Filed: Apr. 20, 2009

(65) Prior Publication Data
US 2009/0285233 A1 Nov. 19, 2009

Related U.S. Application Data

(60) Provisional application No. 61/046,173, filed on Apr. 18, 2008.

(51) Int. Cl.
*H04L 12/28* (2006.01)
*H04L 12/56* (2006.01)
(52) U.S. Cl. ............ 370/392; 370/389; 370/395.3; 370/419

(58) Field of Classification Search ............ 370/419, 370/389, 392, 395.3
See application file for complete search history.

(56) References Cited

U.S. PATENT DOCUMENTS

| | | | | |
|---|---|---|---|---|
| 6,819,652 | B1 * | 11/2004 | Aravamudhan et al. | 370/230 |
| 7,693,171 | B2 * | 4/2010 | Gould | 370/432 |
| 2004/0006708 | A1 * | 1/2004 | Mukherjee et al. | 713/201 |
| 2004/0095881 | A1 * | 5/2004 | Borella et al. | 370/219 |
| 2007/0133492 | A1 * | 6/2007 | Baek et al. | 370/338 |
| 2007/0195824 | A9 * | 8/2007 | Chapman et al. | 370/490 |

OTHER PUBLICATIONS

Cablelabs, "DOCSIS: Downstream External PHY Interface Specification", Aug. 2005.*

* cited by examiner

*Primary Examiner* — Ayaz Sheikh
*Assistant Examiner* — Tarell Hampton
(74) *Attorney, Agent, or Firm* — Troy A. Van Aacken; Robert J. Starr

(57) ABSTRACT

A data communication system includes multiple Media Access Control (MAC) units, multiple physical layer (PHY) interface units, and logic to communicate between the MAC units and the PHY units using a single tunneling protocol over Internet Protocol (IP).

3 Claims, 8 Drawing Sheets

MULTI-SERVICE PHY BOX

PRIORITY CLAIM

This application claims priority under 35 USC 119 to U.S. Application No. 61/046,173 filed on Friday, Apr. 18, 2008, which is incorporated herein by reference in its entirety.

BACKGROUND

Data Over Cable Interface Specification (DOCSIS) is one standard among many others that are moving toward modular systems (e.g. modular cable modem termination system (MCMTS)) in order to lower costs. One way to achieve modularity is to separate the DOCSIS media access control (MAC) functionality from the DOCSIS physical layer (PHY) functionality into two different boxes.

Multiple System Operators (MSOs) in the cable space (or any other space) may want to offer higher bandwidth services over different media (other than coaxial cables). For example, the DOCSIS MSOs may want to offer higher bandwidth services through radio frequency over glass (RFoG) or passive optical network (PON). In the latter case, they will need one PHY box for the DOCSIS service and another for the PON service.

MSOs need a special PHY box for every service they want to offer, which may result in many PHY boxes occupying the headend office consuming extra space and power. Having many PHY boxes may result in high cost systems, especially if these different PHY boxes are not fully utilized. Another disadvantage of having many different PHY boxes is the complex management of dealing with many different vendors.

Inefficient use of resources is a major drawback of having different PHY boxes for different services. When using application-specific PHY devices, reusing these boxes for different services may not be feasible. This does not protect the investment that the MSOs make in buying these PHY boxes.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

Figure 3:
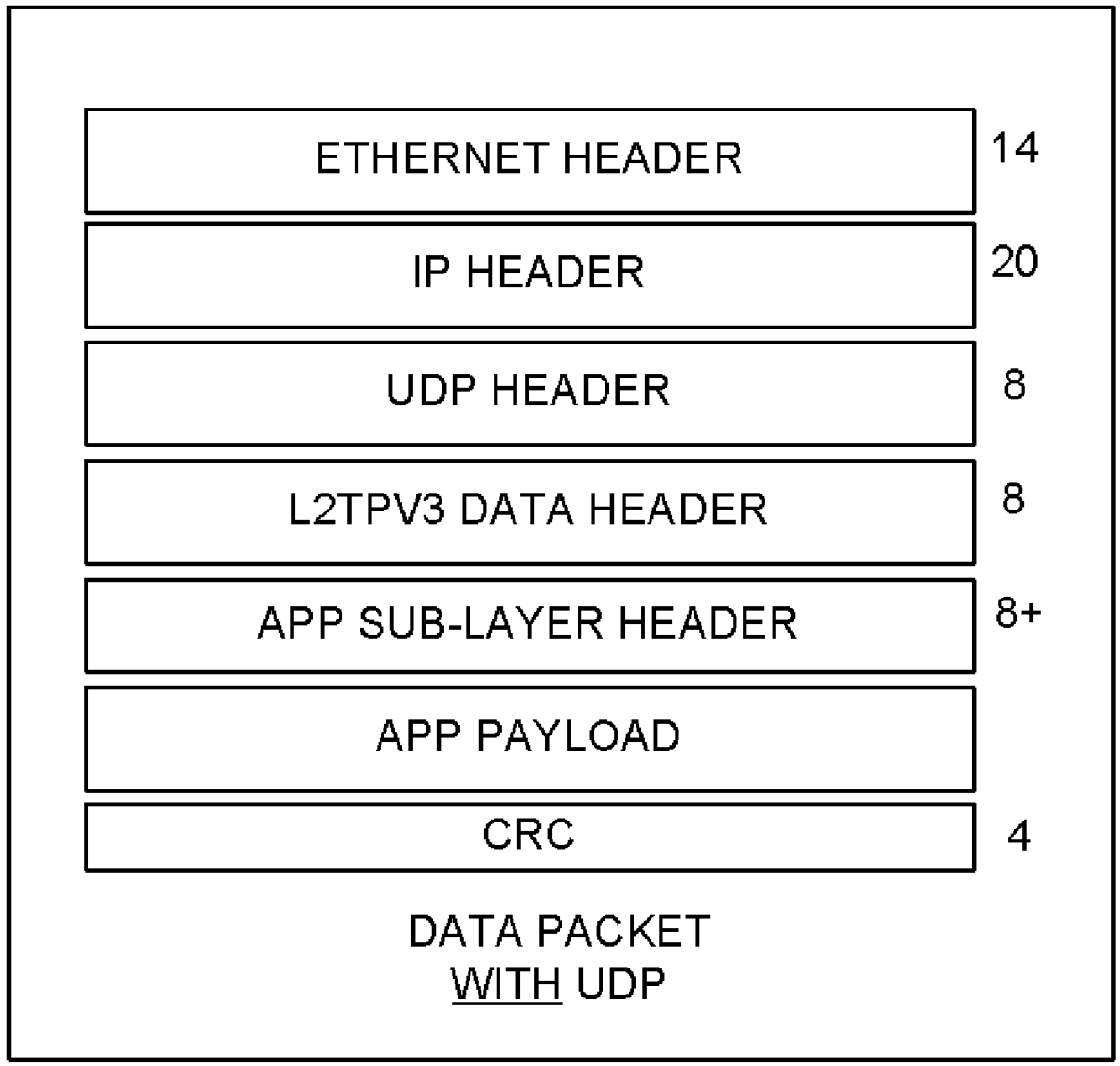
Figure 4:
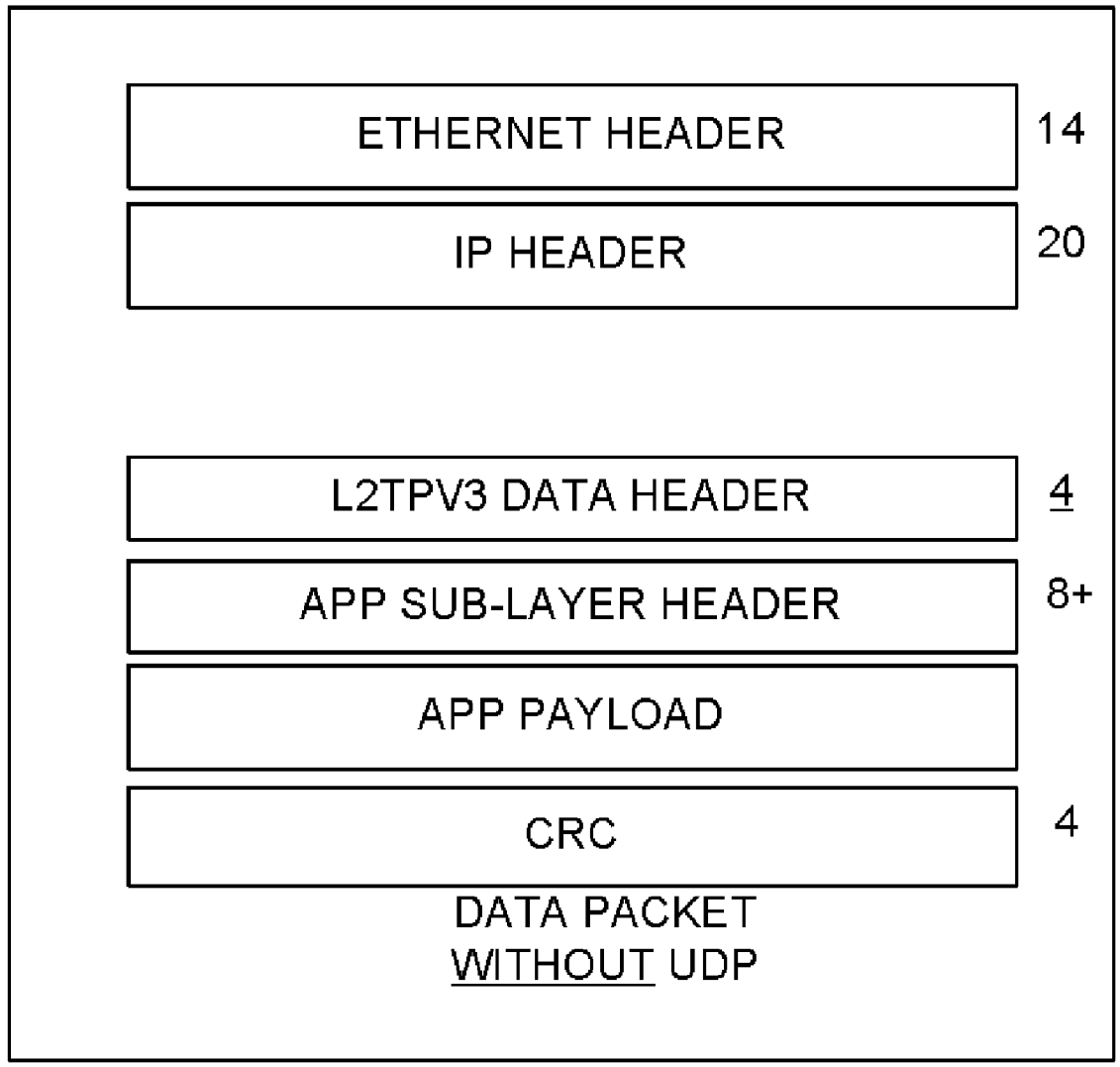

The format of one embodiment of the L2TPv3 packets is shown in FIGS. 3 and 4, where it is shown that the UDP field is optional.

Figure 5:
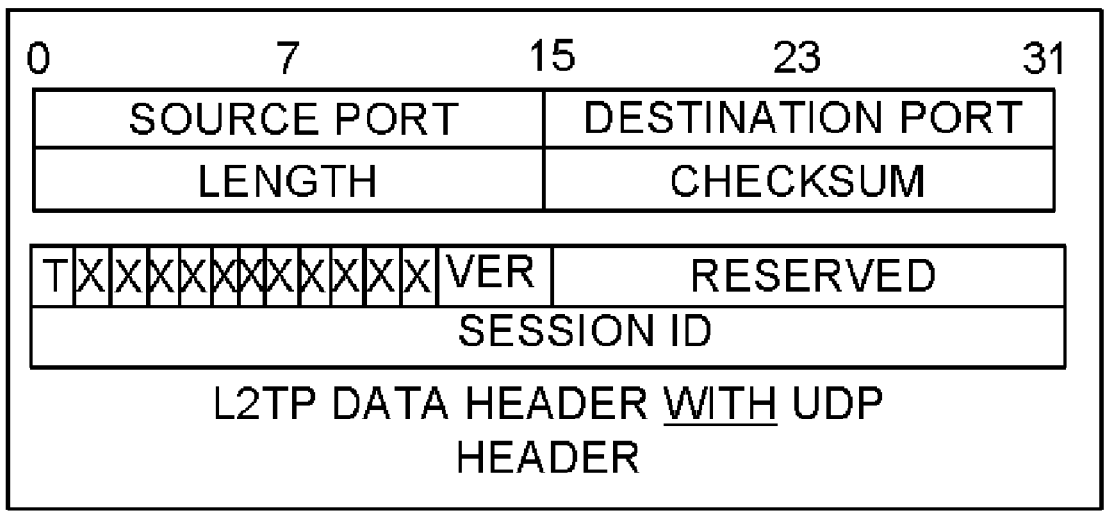
Figure 6:
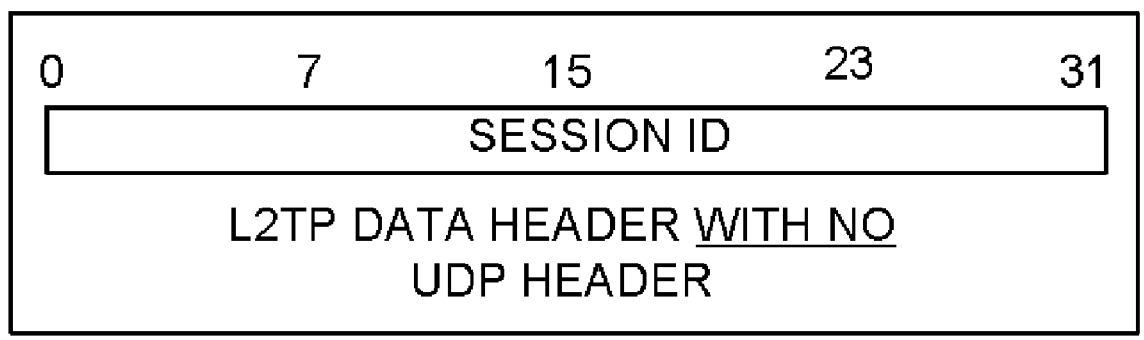

The format of one embodiment of the L2TPv3 data header is shown in FIGS. 5 and 6, where the session ID is provided.

Figure 7:
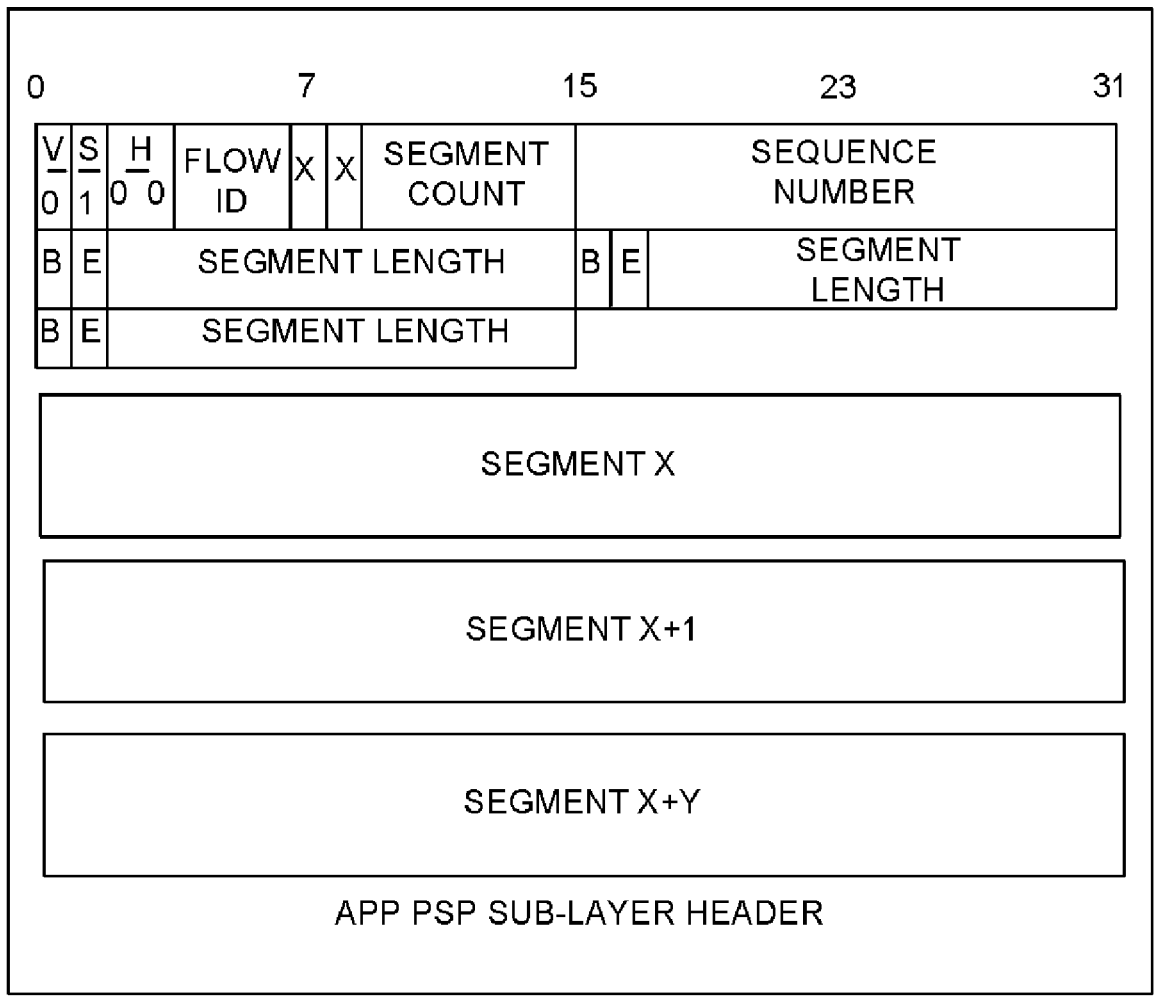
Figure 8:
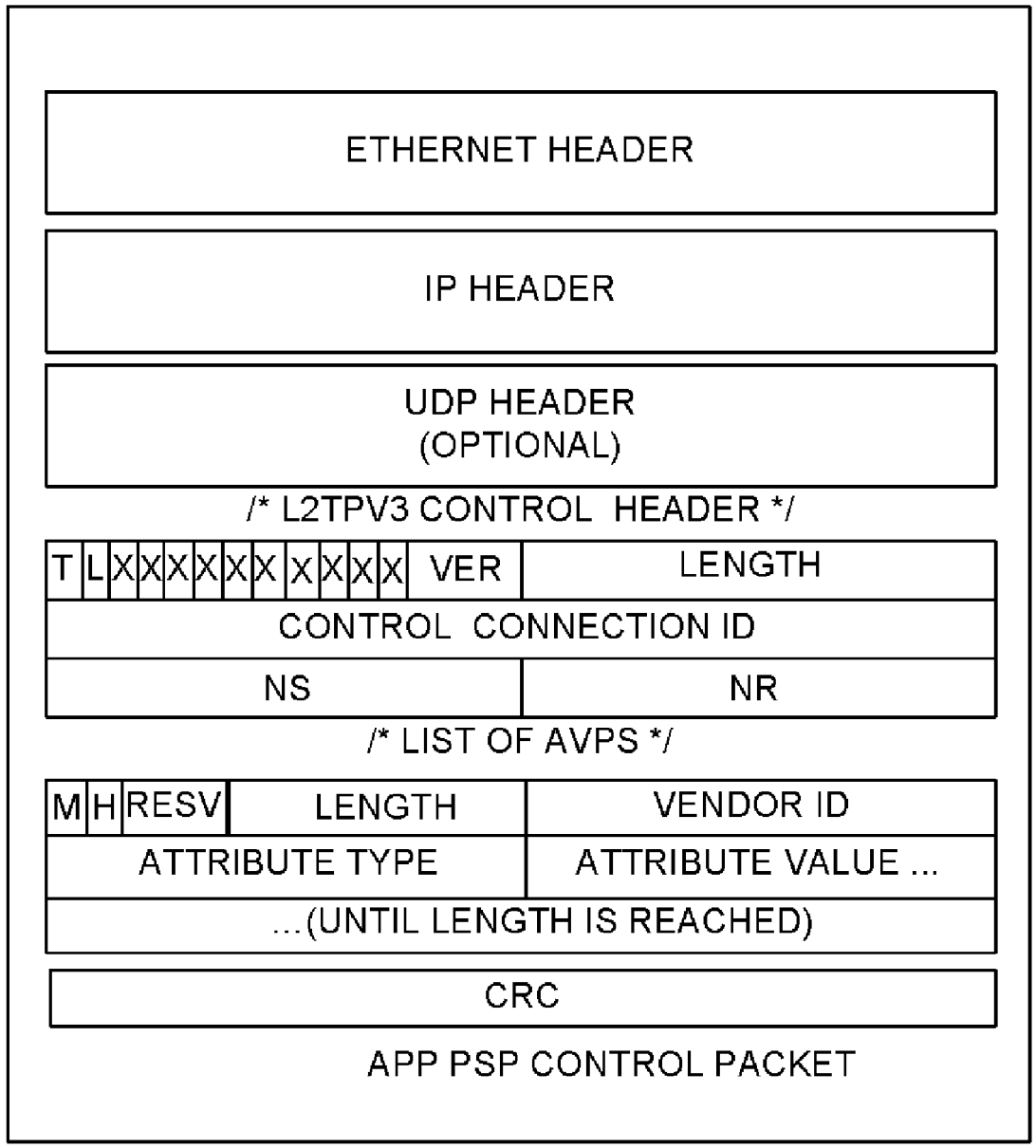

One embodiment of an application (APP) PSP sub-Layer header is shown in FIG. 7, where the same format of this sub-header may be used to support all PHY services In one embodiment, APP control packet has the format shown in FIG. 8, where the session messages are linked to the control connection through an ID.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic is a design decision that will vary according to implementation.

Described herein are embodiments of a general purpose PHY box, that is, a multi-service PHY box. This PHY box may support services based on DOCSIS, PON, Gigabit PON (GPON), Gigabit Ethernet PON (GEPON), Ethernet, RFOG, WiMax, Wi-Fi, ADSL, DSL, Power-line communications, etc.

This multi-service box acts as an interface between the physical media and the IP network. Data is communicated between the PHY box and the IP network (which contains the MAC functionality of different services) via a tunneling protocol.

One embodiment of a multi service PHY box supports both upstream (US) and downstream (DS) PHYs (unlike conventional M-CMTS PHY boxes that support only downstream PHYs) in a modular expandable capacity. Embodiment of the external PHY box may support more than one PHY type. The PHY box uses a tunneling protocol to support different services.

A data communication system is described herein that includes multiple Media Access Control (MAC) units, multiple physical layer (PHY) interface units, and logic to communicate between the MAC units and the PHY units using a single tunneling protocol over Internet Protocol (IP). The system may include logic to establish a PHY-specific control channel between each MAC unit and a corresponding PHY unit and logic for each PHY unit to assign a session ID to each corresponding MAC unit. The session ID may be used to identify the type of PHY, to route packets to a particular PHY, and to interpret application payloads properly. The system may include logic to enable a MAC unit and a corresponding PHY unit to agree on an Attribute Value Pair (AVP) interpretation that is unique to the MAC unit and corresponding PHY unit.

Figure 1:
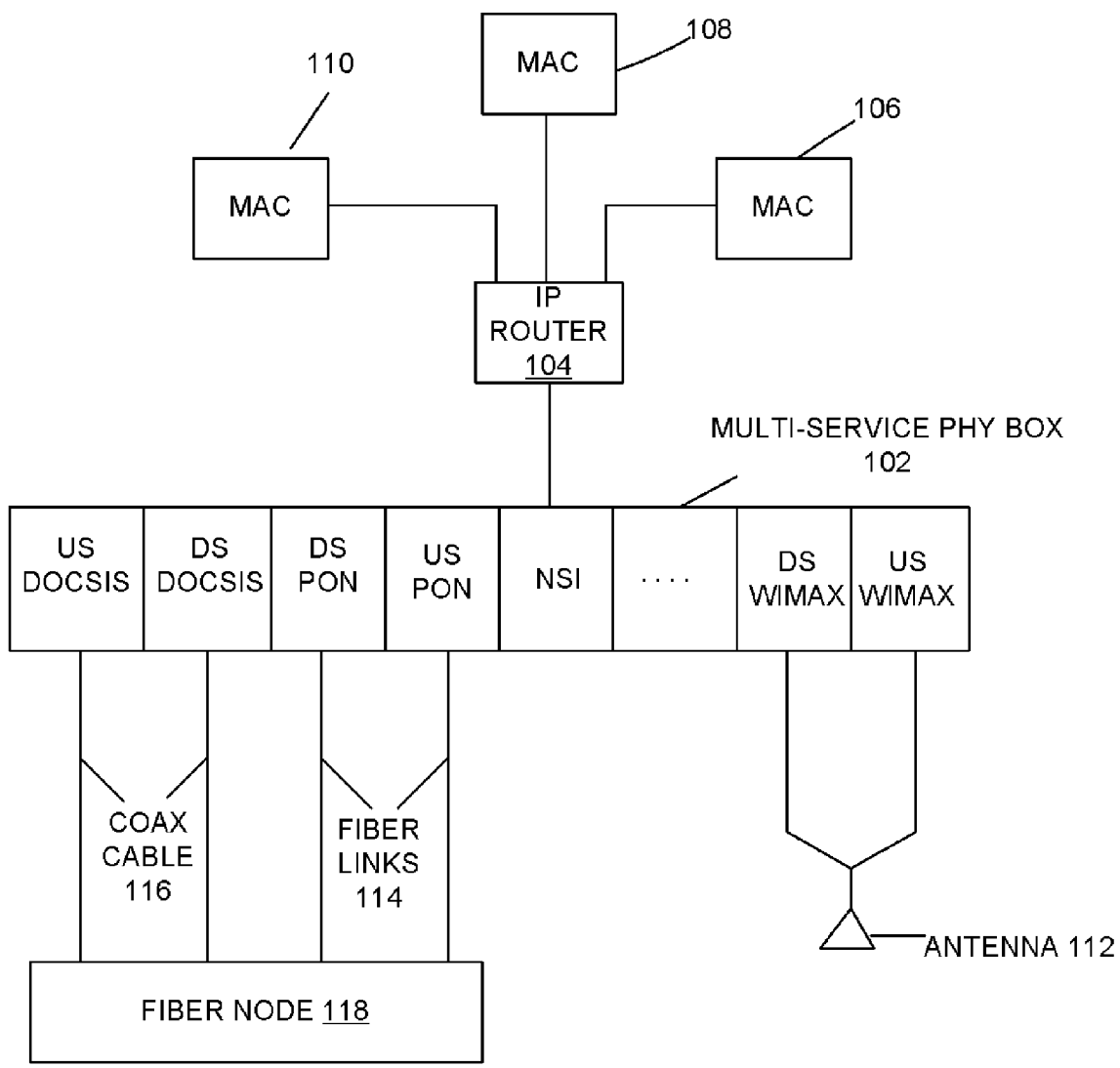
FIG. 1 is a block diagram illustration of an embodiment of a system including separate MAC and PHY components.

FIG. 1 shows an embodiment of a multi-service PHY system, which is connected to IP network through an Ethernet link that carries data via to a tunneling protocol. FIG. 1 is a block diagram illustration of an embodiment of a system including separate MAC and PHY components. Multiple PHY components 106, 108, 110 interface through an IP router 104 to a multi-service PHY box 102. External PHY box 102 may support multiple PHY service interfaces both to an antenna 112 and to a fiber node 118 via one or more of a coaxial cable 116 and/or optical fiber (e.g. PON) 114. The PHY box 102 supports both upstream (US) and downstream (DS) channels in a modular expandable fashion. The PHY 502 communicates with the IP router 104 via the IP protocol. The tunneling within the IP protocol may be implemented for example using Layer 2 Tunneling Protocol Version 3.0 (L2TPv3). The individual PHY service components of the PHY box 102 communicate with their respective MAC domains using a tunneling protocol within the IP protocol.

Figure 2:
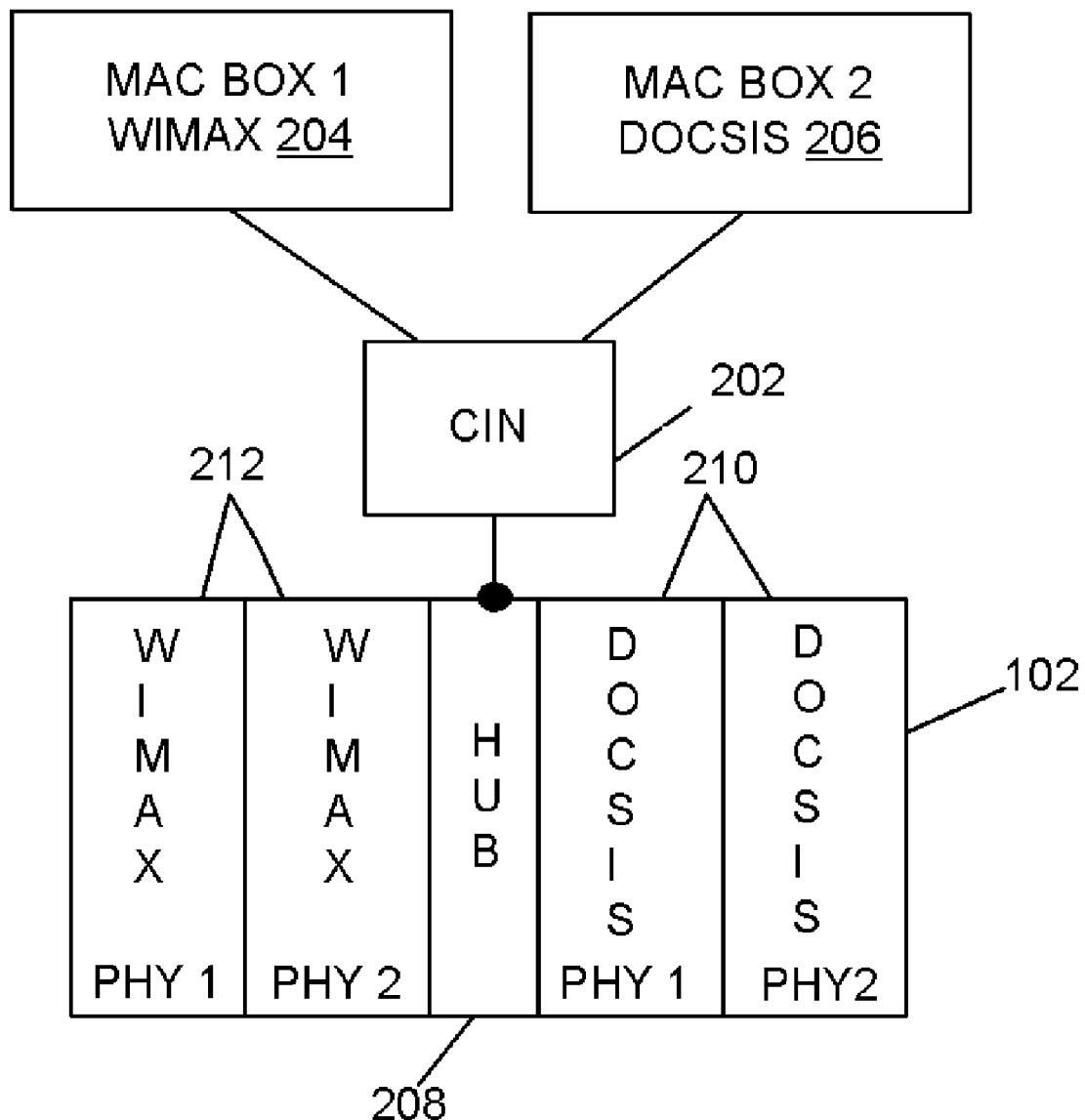
FIG. 2 is a block diagram illustration of an embodiment of a system in which the MAC functionality is coupled to external PHY functionality.

FIG. 2 is a block diagram illustration of an embodiment of a system in which the MAC functionality is coupled to external PHY functionality. Multiple MAC units 204, 206 communicate with corresponding PHY unites in the multi-PHY box 102. Communication is accomplished via tunneling protocol over IP and via a converged interconnect network 202. The Converged Interconnect Network (CIN) 202 is a collection of switches and routers, a collection of layer2 and layer3 networks. Within the multi-service PHY box 502 are multiple DOCSIS PHY units 210 and multiple WiMAX units 212. The WiMAX MAC functionality 204 communicates with and controls the WiMAX PHY units 212, and vice versa, using a tunneling protocol specific to WiMAX. Likewise, the DOCSIS MAC box 206 communicates with and controls the DOCSIS PHY units 210 via a DOCSIS-specific tunneling protocol. One embodiment uses a single L2TPv3 tunneling protocol to support all PHY services in the PHY box.

For example, in FIG. 2, a L2TPv3 tunneling protocol may between the MAC functions (204, 206) and the corresponding PHY functions (210, 212). In other words, L2TPv3 is an IP tunnel which is defined as a pseudowire that exists between the MAC functions and corresponding PHY functions. Note that the Converged Interconnect Network (CIN) may be an L2 or L3 (layer 2 or layer 3) network. Each tunnel may have one or more control connections between each MAC box and the PHY box for configuration. It also establishes one session for each "channel", where each session can have one or more flows. The tunnel should support at least the Packet Streaming Protocol (PSP) pseudowire type, where it encapsulates a continuous stream of frames into a tunnel payload.

The format of one embodiment of the L2TPv3 packets is shown in FIGS. 3 and 4, where it is shown that the UDP field is optional. The MAC boxes and PHY box may be configured separately whether or not to use a UDP header. The format of one embodiment of the L2TPv3 data header is shown in FIGS. 5 and 6, where the session ID is provided. The session ID is negotiated by the L2TPv3 control plane.

One embodiment of an application (APP) PSP sub-Layer header is shown in FIG. 7, where the same format of this sub-header may be used to support all PHY services (the APP sub-header may be identical to the DEPI sub-header used to support DOCSIS between the MCMTS and EQAMs). Note that multiple flows are supported per session (channel) through the Flow ID field shown in the APP PSP header.

DOCSIS DEPI supports another mode to move data around inside an L2TPv3. This mode is called the MPEG Transport (MPT). Therefore, the APP data transfer may be achieved in different ways and a generic APP protocol that supports multiple PHY services may define as many as desired (although the PSP mode alone is enough).

The following description sets forth one embodiment of a process to provide service over the L2TPv3 tunneling protocol. Each MAC box establishes at most one control connection to the PHY box. Underneath each control connection, there may be one or more APP sessions (pseudowires). Each APP session connects the MAC core to a single "channel", where each APP session (PSP or other) may have one or more flows (flows will be carrying the real data).

In one embodiment, the control connection messages of the L2TPv3 protocol are:

SCCRQ (Start-Control-Connection-Request . . . From MAC box to PHY box)

2. SCCRP (Start-Control-Connection-Reply . . . From PHY box to MAC box)

3. SCCCN (Start-Control-Connection-Connected (MAC box to PHY box)

4. StopCCN (Stop-Control-Connection-Notification either can send)

5. HELLO (hello)

6. ACK (explicit acknowledgment)

To establish a control L2TPv3 connection, the MAC box sends an SCCRQ message to the PHY box, where it lists it APP pseudowire capabilities. The PHY box chooses the pseudowire type for the APP and sends that through an SCCRP message to the MAC box. The MAC box acknowledges the connection by sending an SCCN message to the PHY box. Now, the control connection is set up. Next, the L2TPv3 establishes a session per channel, which is done through the L2TPv3 session messages:

Incoming-Call-Request (ICRQ)
Incoming-Call-Reply (ICRP)
Incoming-Call-Connected (ICCN)
Call-Disconnect-Notify (CDN)
Set Link Info (SLI)

To establish a session, the MAC core chooses a channel based on IP address of the PHY box and the TSID (Transport ID, which is a channel identifier that is unique per headend, which represents a resource (channel)). Once the channel has been chosen by the MAC box, it sends an ICRQ message to the PHY box which replies using the ICRP message, which contains the session ID, flow ID, and configurable PHY parameters. The MAC box acknowledges and sets the allowable PHY parameters using the ICCN message. At this point, the session has been setup. Note that the PHY box may send a CDN message if it disagrees on the parameters set by the MAC box.

The session ID is assigned by the PHY box in its reply to the request of the MAC box to setup a session. The PHY box session ID is used in a manner to provide mapping/interpretation for:

Type of PHY service (e.g., WiMAX, DOCSIS, PON, etc.)
Slot number in PHY box.
Payload type.
Other.

For example, the session ID may be ABCDE, where A indicates the service type, B indicates the slot number, C indicates the payload type, and D indicates the some other info, while E is an arbitrary number to differentiate between sessions that have the same characteristics. This helps the HUB 208 in the PHY box to steer packets (that belong to a certain session) to the right slot, and interpret the payload correctly according to the service type and some other parameters that may be extracted from the session ID.

In one embodiment, APP control packet has the format shown in FIG. 8, where the session messages are linked to the control connection through an ID. The control message contains a list of Attribute Value Pairs (AVP) which contains interface specific details. These AVPs will be mapped differently for different PHY services because each service may have its own attributes.

To summarize, embodiment of a PHY box, system incorporating a PHY box, and methods therein include:

Supports PHY interfaces in both the US and DS directions.

Use of a single tunneling protocol (L2TPv3) to support all PHY services.

A Session ID assigned by the PHY box to the MAC core for the DS service helps in identifying the type of PHY, routing packets of specific PHY service to the right slot, and interpreting payloads of APP packets properly. The criteria of how to interpret the session ID is agreed on between the MAC and PHY boxes. This enables an end-to-end system where multiple different PHY blades exist in one box. For the US direction, a Session ID assigned by the MAC core to the PHY box for the US service helps in identifying the type of PHY, routing packets of specific PHY service to the right slot, and interpreting payloads of APP packets properly. The criteria of how to interpret the session ID is agreed on between the MAC and PHY boxes Different AVP interpretations are agreed on (between the PHY and MAC boxes) for different PHY services. This enables an end-to-end system where multiple different PHY blades exist in one box.

Setting a session includes using a tunnel, such as, for example, an L2TPv3 tunnel, to support multiple services; determining a session ID based on a service, slot number, etc; and interpreting AVPs differently for different services.

Although certain embodiments have been described with particulars, the skilled practitioner will now see that other embodiments are possible with other particulars. For example, other tunneling protocols could be used, such as GRE, MPLS, IPsec, etc. Furthermore, in FIGS. 1 and 2, the modules (US DOCSIS, DS DOCSIS, DS PON, US PON, DS, WIMAX US, WIMAX DS, DOCSIS PHY, WiMAX PHY) represent logical functionality. Modules can be US PHY or DS PHY for a particular physical type, or both. Although tailored toward DOCSIS MSOs the methods, devices, and systems described herein are applicable to other service providers as well.

Those having skill in the art will appreciate that there are various logic implementations by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A data communication system, comprising
multiple Media Access Control (MAC) units;
multiple physical layer (PHY) interface units, at least some of the PHY units having different physical media types from one another;
logic to communicate between the MAC units and the PHY units using tunneling protocol over Internet Protocol (IP)
logic to enable a MAC unit of the multiple MAC units and a corresponding PHY unit of the multiple PHY units to agree on an Attribute Value Pair (AVP) interpretation that is unique to the MAC unit and corresponding PHY unit; and
logic for each PHY unit to assign a session ID to each corresponding MAC unit, the session ID used to identify the type of PHY, to route packets to a particular PHY, and to interpret application payloads.

2. The system of claim 1, where the tunneling protocol used is Layer 2 Tunneling Protocol Version 3 (L2TPv3).

3. The system of claim 1, where the logic to communicate between the MAC units and the PHY units using a tunneling protocol over IP further comprises:
logic to establish a PHY-specific control channel between each MAC unit and each corresponding PHY unit.

* * * * *